United States Patent
Nakai

(10) Patent No.: US 9,305,250 B2
(45) Date of Patent: Apr. 5, 2016

(54) IMAGE PROCESSING APPARATUS AND IMAGE PROCESSING METHOD INCLUDING LOCATION INFORMATION IDENTIFICATION

(71) Applicant: Akiyoshi Nakai, Kanagawa (JP)

(72) Inventor: Akiyoshi Nakai, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 43 days.

(21) Appl. No.: 13/955,208

(22) Filed: Jul. 31, 2013

(65) Prior Publication Data

US 2014/0049798 A1    Feb. 20, 2014

(30) Foreign Application Priority Data

Aug. 16, 2012   (JP) ................. 2012-180630

(51) Int. Cl.
G06K 15/02 (2006.01)
H04N 1/40 (2006.01)
H04N 1/46 (2006.01)
H04N 1/60 (2006.01)

(52) U.S. Cl.
CPC ........ *G06K 15/1878* (2013.01); *H04N 1/40062* (2013.01); *H04N 1/465* (2013.01); *H04N 1/6072* (2013.01)

(58) Field of Classification Search
CPC .......... G06K 15/1878; G06K 9/00463; G06K 9/2054; H04N 1/40062; H04N 1/465; H04N 1/6072
USPC ........... 382/176, 177, 317, 321; 358/1.11, 2.1
See application file for complete search history.

(56) References Cited

U.S. PATENT DOCUMENTS

| | | | | |
|---|---|---|---|---|
| 4,769,849 A * | 9/1988 | Alsing | ................... | G06K 9/342 382/176 |
| 5,570,435 A * | 10/1996 | Bloomberg et al. | .......... | 382/283 |
| 7,321,688 B2 * | 1/2008 | Fujiwara | ....................... | 382/176 |
| 2006/0062453 A1 * | 3/2006 | Schacht | ........................ | 382/164 |
| 2009/0257653 A1 * | 10/2009 | Ashikaga | ..................... | 382/173 |
| 2011/0286062 A1 | 11/2011 | Nakai | | |
| 2012/0131520 A1 * | 5/2012 | Tang et al. | .................... | 715/863 |
| 2013/0155467 A1 | 6/2013 | Nakai | | |

FOREIGN PATENT DOCUMENTS

| | | |
|---|---|---|
| JP | 2-017767 | 1/1990 |
| JP | 10-324025 | 12/1998 |

OTHER PUBLICATIONS

Mary Richardson, "Use Word's Find and Replace feature to change text from Bold to Blue", http://www.techrepublic.com/blog/microsoft-office/use-words-find-and-replace-feature-to-change-text-from-bold-to-blue/ [accessed Dec. 5, 2014].*

* cited by examiner

*Primary Examiner* — Quang N Vo
(74) *Attorney, Agent, or Firm* — Harness, Dickey & Pierce, P.L.C.

(57) ABSTRACT

An image processing apparatus includes an image-area separator that separates a character area from monochrome document data scanned by a scanner, a character pixel detecting unit that counts the number of pixels of a character in the main scanning direction and the sub-scanning direction included in a controller, a bolded character identifying unit that identifies a character as a bolded character in case the count result is larger than a predefined threshold value, and a color converter that converts the bolded character into color data.

9 Claims, 7 Drawing Sheets

FIG. 4A

BOLDED CHARACTER LOCATION INFORMATION ①

|   | LOCATION INFORMATION |
|---|---|
| ① | CENTER |
| ② | UPPER LEFT |
| ③ | UPPER CENTER |
| ④ | UPPER RIGHT |
| ⑤ | LOWER LEFT |
| ⑥ | LOWER CENTER |
| ⑦ | LOWER RIGHT |
| ⑧ | OTHER |

BOLDED CHARACTER LOCATION INFORMATION ②

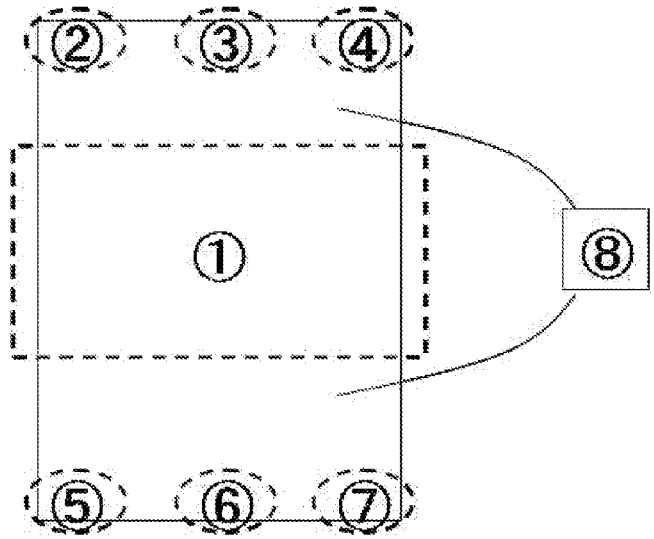

FIG. 4B

BOLDED CHARACRTER SURROUNDING INFORMATION

|   | SURROUNDING INFORMATION |
|---|---|
| A | CHARACTER |
| B | PICTURE |
| C | BLANK |

FIG. 4C

INFORMATION ON PAGE THAT HAS BOLDED CHARACTER

|   | PAGE INFORMATION |
|---|---|
| α | PAGE 1 |
| β | PAGE 2 OR LATER |

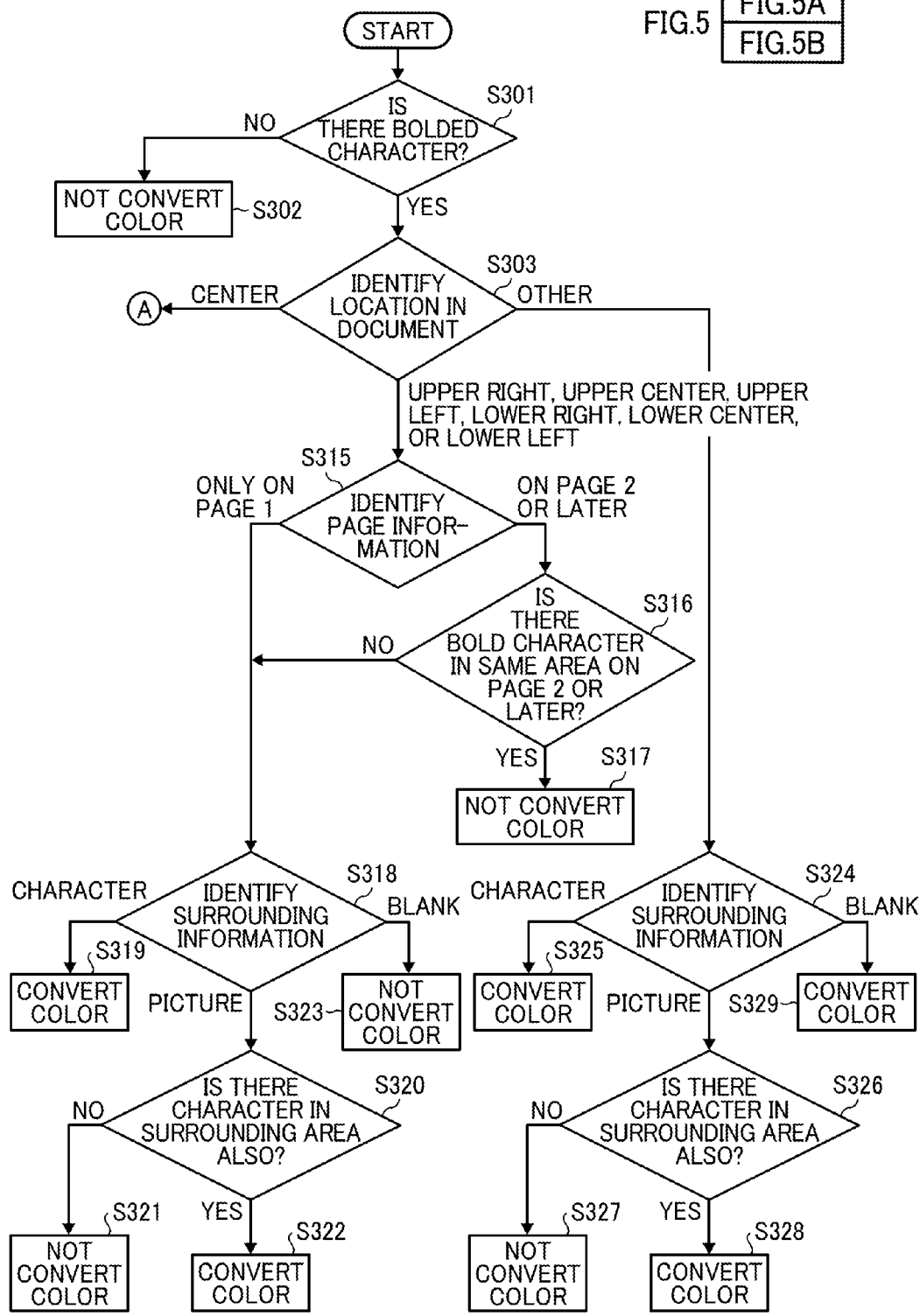

IMAGE PROCESSING APPARATUS AND IMAGE PROCESSING METHOD INCLUDING LOCATION INFORMATION IDENTIFICATION

CROSS-REFERENCE TO RELATED APPLICATION

This patent application is based on and claims priority pursuant to 35 U.S.C. §119 to Japanese Patent Application No. 2012-180630, filed on Aug. 16, 2012 in the Japan Patent Office, the entire disclosure of which is hereby incorporated by reference herein.

BACKGROUND

1. Technical Field

The present invention relates to an image processing apparatus, image processing method, and recording medium storing a program.

2. Background Art

Conventionally, in the case of printing monochrome electronic data, copying monochrome documents, and distributing them, there is demand for printing the monochrome data partially in color such as a highlight point to make an important part clear.

To satisfy this kind of demand, a technology that detects gradation of a monochrome document, adds color information to the document depending on the gradation, and which prints even monochrome documents in color, has been proposed (e.g., JP-H10-324025-A.) However, one problem is that bolded characters are not colorized, making it difficult to identify the bolded characters.

SUMMARY

The present invention provides an improved image processing apparatus that includes an image-area separator that separates a character area from a monochrome document, a bolded character identifying unit that identifies the character area as a bolded character in case the number of pixels in the separated character area is larger than a predefined value, and a color converter that converts the bolded character into a color image in case the character area is identified as the bolded character.

BRIEF DESCRIPTION OF THE DRAWINGS

A more complete appreciation of the disclosure and many of the attendant advantages thereof will be readily obtained as the same becomes better understood by reference to the following detailed description when considered in conjunction with the accompanying drawings.

FIGS. 4A, 4B, and 4C are diagrams illustrating a process executed by a color converter that identifies whether or not bolded character information is converted into color information as an embodiment of the present invention.

FIGS. 5A and 5B are flowcharts illustrating a process executed by the color converter as an embodiment of the present invention.

DETAILED DESCRIPTION

Figure 1:
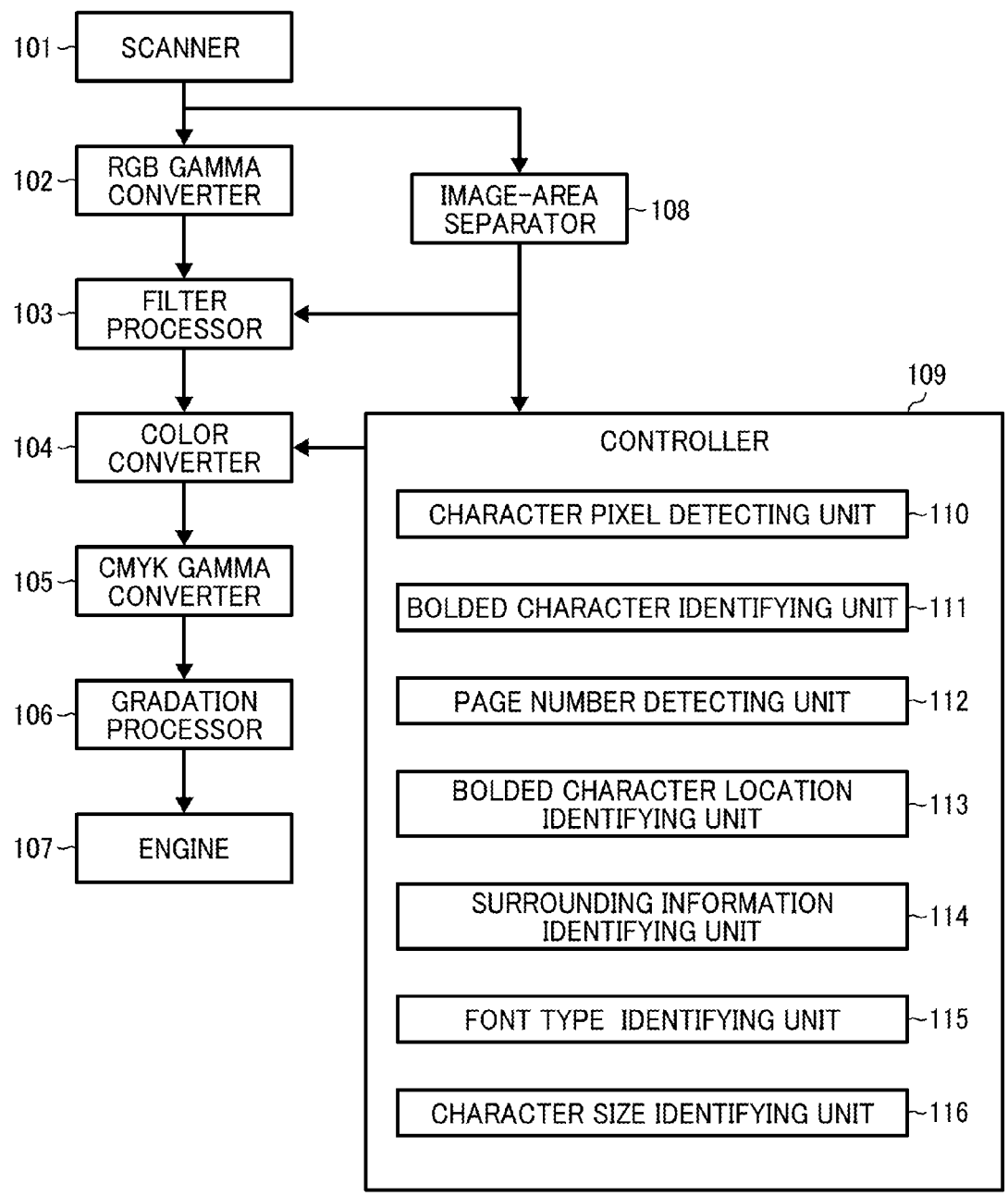
FIG. 1 is a block diagram illustrating a configuration of an image processing apparatus as an embodiment of the present invention.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

To cope with the above problem, the present invention provides an image processing apparatus that colorizes a bolded character part (emphatic part) and makes it easy to identify that part. In a process of colorizing a monochrome document, the image processing apparatus of the present invention identifies weight of a character in the monochrome document, identifies an area to be color-converted among bolded characters depending on a characteristic of the document such as layout, and performs color conversion.

FIG. 1 is a block diagram illustrating a configuration of an image processing apparatus. Shown in FIG. 1 are a scanner 101 that scans a monochrome document, a RGB gamma convertor 102 that performs a gamma conversion process on the scanned data, a filter processer 103 that performs an edge emphasizing process and a smoothing process, a color converter 104 that converts the identified bolded character into color data, a CMYK gamma converter 105 that performs gamma conversion process on the color data, a gradation processor 106 that converts a multivatic image into a lessvalued image, a printer engine 107 that forms an image, an image-area separator 108 that identifies a character, a photo, and blank from the scanned data, and a controller 109. The controller 109 includes units such as a character pixel detecting unit 110 that counts the number of pixels of a character, a bolded character identifying unit 111 that identifies a character as a bolded character in case the number of pixels of the character is larger than a predefined threshold value, a page number detecting unit 112 that detects a page number that includes a bolded character, a bolded character location identifying unit 113 that identifies location of a bolded character in a page, a surrounding information identifying unit 114 that identifies surrounding information of a bolded character, a font type identifying unit 115 that identifies a font type, and a character size identifying unit 116 that identifies a character size. In normal copy operation, the color converter 104 converts RGB data into CMYK data.

After the image-area separator 108 performs a separating process on the monochrome document data scanned by the scanner 101, the area identified as a character is input into the controller 109. The character pixel detecting unit 110 in the controller 109 counts the number of pixels in the main scanning direction, the sub-scanning direction, and the diagonal direction of the character. The bolded character identifying unit 111 identifies the character as a bolded character in case the count obtained by the character pixel detecting unit 110 is larger than a predefined threshold value. The color converter 104 converts the bolded character part into color data (e.g., red).

Figure 2:
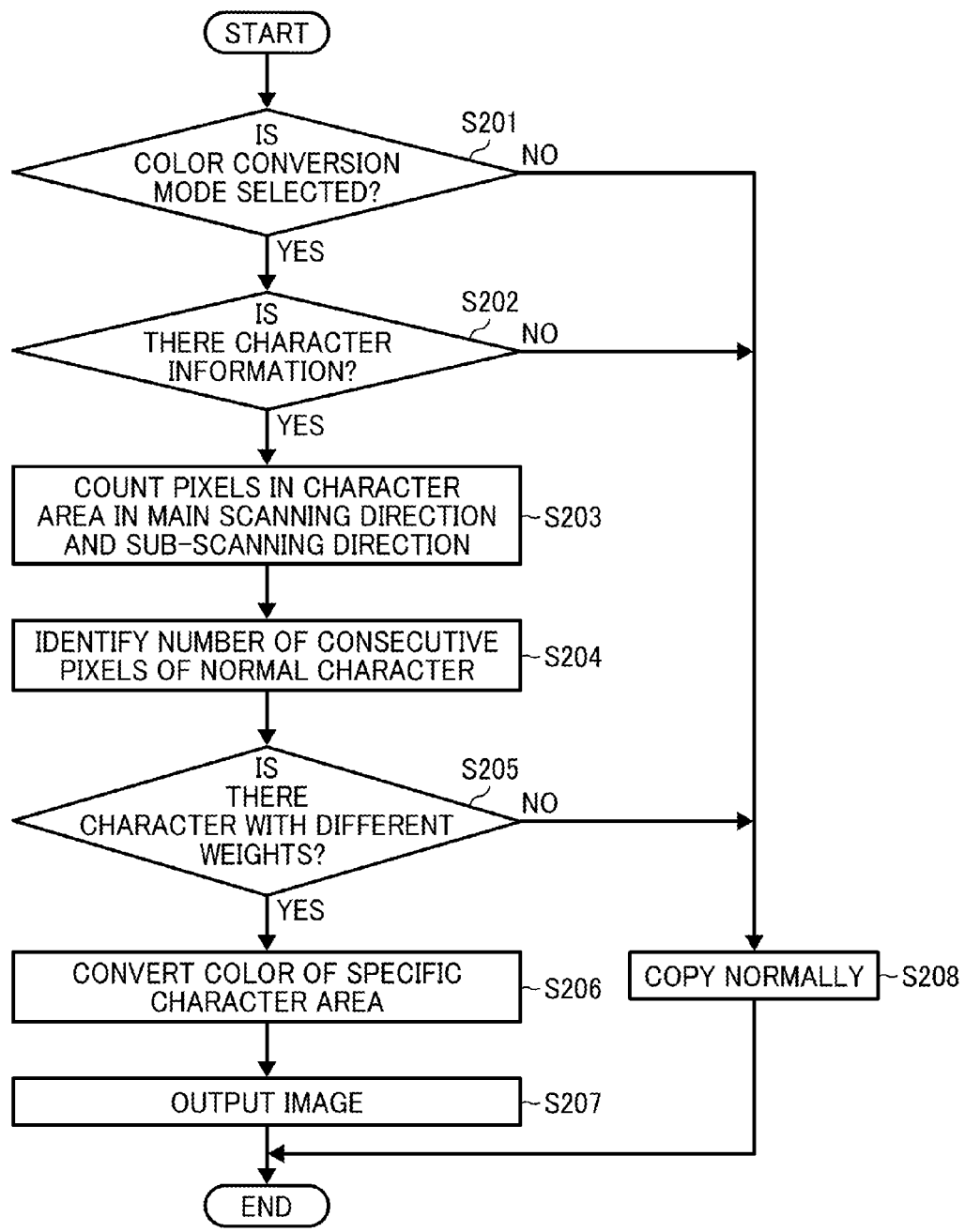
FIG. 2 is a flowchart illustrating a process executed in an embodiment of the present invention.

FIG. 2 is a flowchart illustrating a process executed in this embodiment. After starting functions such as copying, scanning, and printing, the image-area separator 108 determines whether or not a color conversion mode (a function that colorizes a bolded character in a monochrome document) is selected (201). If the color conversion mode is selected (YES in 201), the image-area separator 108 detects whether or not there is character information in the document (202). If there is no character, a normal copy operation is performed (208). If there is a character, the character pixel detecting unit 110 counts the number of pixels in the character area in the main scanning direction and the sub-scanning direction (203). After performing the same process on all character areas in the whole page, a standard number of pixels (threshold value) for normal characters (standard characters) used in the document is identified (204). Subsequently, the bolded character identifying unit 111 determines whether or not there is a character larger than the standard number of pixels (a character with different weight) in the document (205). If there is a target character, the color converter 104 performs color information conversion process on the specified character area (206), and the image is output (207).

Figure 3A:
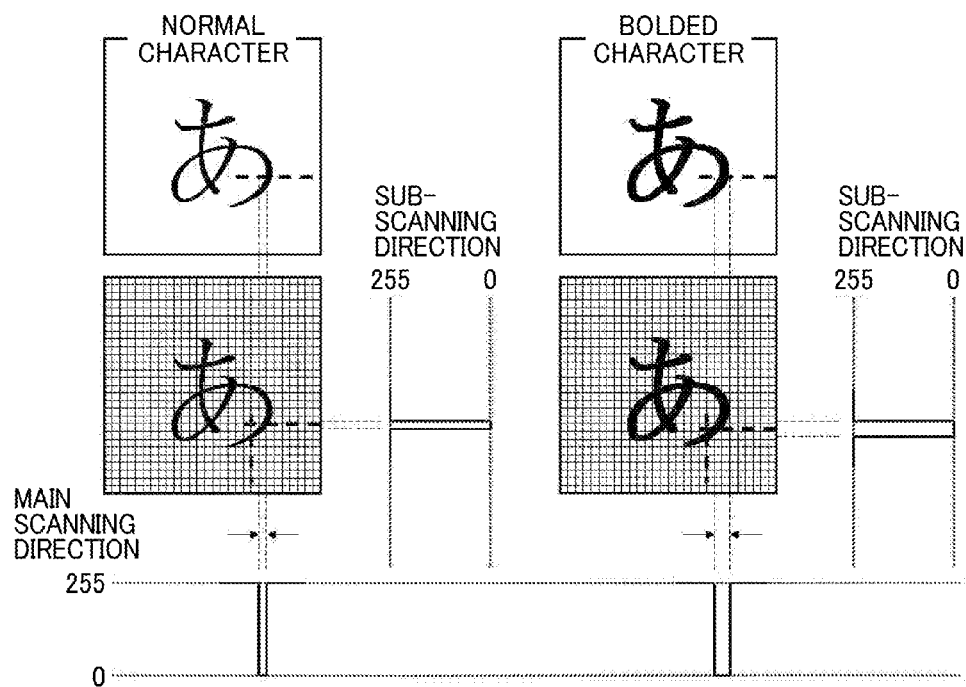
FIGS. 3A and 3B are diagrams illustrating a process performed by a character pixel detecting unit and a bolded character identifying unit as an embodiment of the present invention.
Figure 3B:
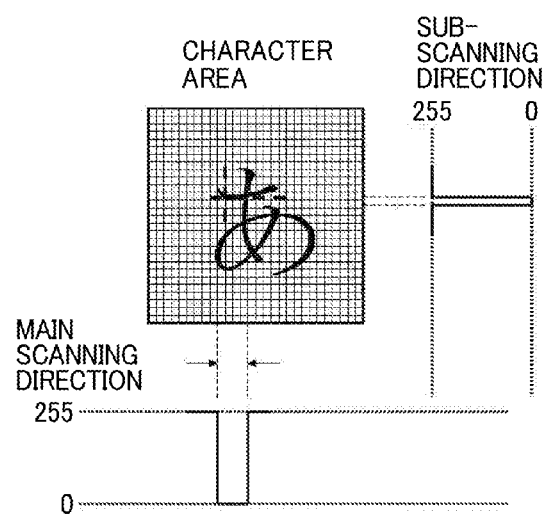

FIGS. 3A and 3B are diagrams illustrating a process performed by the character pixel detecting unit 110 and the bolded character identifying unit 111. As shown in FIG. 3A, the character pixel detecting unit 110 counts the number of pixels for the area recognized as the character area in the main scanning direction and the sub-scanning direction and counts the number of pixels in black area regarding points where data changes from white (255) to black (0) rapidly in each scanning direction.

Taking the number of pixels of the standard character in the main scanning direction and the sub-scanning direction as the threshold value, the bolded character identifying unit 111 identifies a character whose number of pixels in the main scanning direction and the sub-scanning direction is larger than the threshold value as a bolded character.

Here, as shown in FIG. 3B, after counting the number of pixels in the main scanning direction and the sub-scanning direction at the same point, if the number of pixels in the main scanning direction and the sub-scanning direction is not the same, it is determined that the counting is performed at a horizontal line area (or a vertical line area). In that case, it is necessary to count at an area where such case does not occur or to adopt one with fewer pixels.

FIGS. 4A, 4B, and 4C are diagrams illustrating a process executed by the color converter that determines whether or not bolded character information is converted into color information. FIG. 4A illustrates an identification result indicating that the bolded character location identifying unit 113 identifies a location of the bolded character in a document page. FIG. 4B illustrates an identification result indicating that the surrounding information identifying unit 114 identifies information surrounding the bolded character. FIG. 4C illustrates a detection result indicating that the page number detecting unit 112 detects the page number that includes the bolded character.

Using a combination of the results illustrated in FIGS. 4A, 4B, and 4C, the color converter 104 identifies whether or not the target bolded character is to be converted into color information. Several specific examples are described in detail below.

If the location of the bolded character is "circled number 1", "C" and "α", the conversion of the color information is not performed since it is probable that the target bolded character is a title written on the front cover.

If the bolded character is located at from circled number 2 to circled number 7, the conversion of the color information is not performed since it is probable that the target bolded character is a header or footer. If the bolded characters exist at the same location in both "α" and "β" in addition to from circled number 2 to circled number 7, the conversion of the color information is not performed since it is probably a header or footer.

If the bolded character is located at from circled number 1 to circled number 7 and the surrounding information in all directions is "A", the conversion of the color information is performed regardless of other conditions. If the bolded character is located at circled number 8 and the surrounding information is "B", the conversion of the color information is not performed since it is probable that it is a caption of a photo or a chart, a name of a table, or a name of a chart. In other cases, the conversion of the color information is performed. As described above, it is possible to change color of specific bolded characters, and unintentional color conversion is not performed.

Figure 5B:
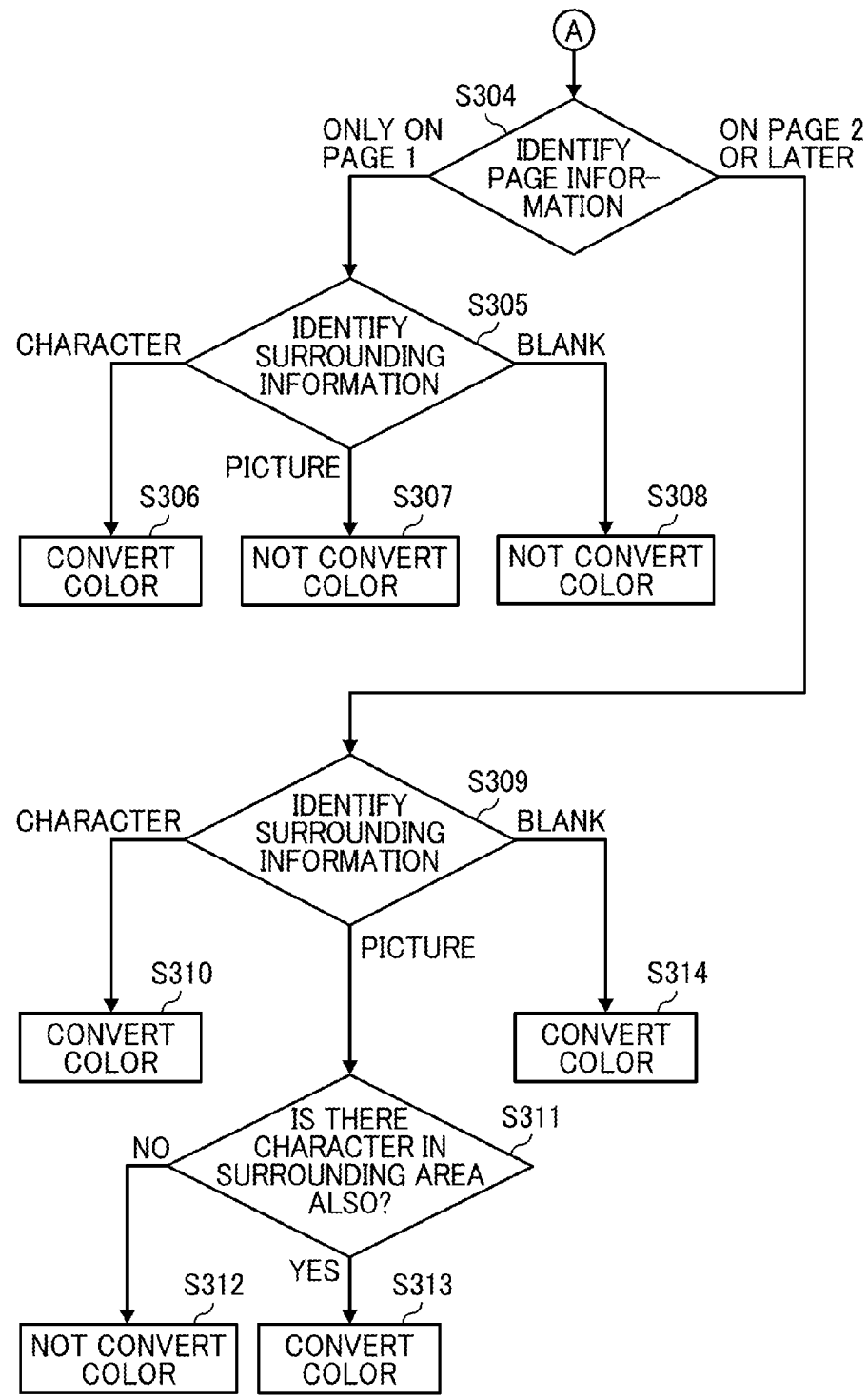

FIGS. 5A and 5B are flowcharts illustrating a process executed by the color converter. If there is a bolded character (YES in 301), the location of the bolded character in the document is identified first (303).

(1) In Case the Bolded Character is Located at Center.

After identifying the page information (304), if the bolded character is located on the first page, the image information surrounding the bolded character is identified (305). If there is a character in the surrounding area, it is determined that the bolded character is located in text, and the color conversion is performed (306). If there is a photo or blank in the surrounding area, it is determined that the bolded character is in the title of the document written on the front cover, and the color conversion is not performed (307 and 308).

If the bolded character is located on the second page or later (304), the image information surrounding the bolded character is identified (309). If there is a character or blank in the surrounding area, the color conversion for the bolded character is performed (310 and 314). If there is a photo in the surrounding area, it is determined whether or not there is a character in the further surrounding area (e.g., in any direction on the left, right, top, and bottom) (311). If there is a character in the surrounding area, the color conversion for the bolded character is performed since it is probable the bolded character exists in text (313). If there is no character in the surrounding area of the bolded character, the color conversion for the bolded character is not performed since it is probable that the bolded character is in text that explains the photo or name of the photo (312).

(2) In Case the Bolded Character is Located at any of Upper Left, Upper Center, Upper Right, Lower Left, Lower Center, or Lower Right After identifying the page information (315), if the bolded character is located on the first page, the image information surrounding the bolded character is identified (318). If there is a character in the surrounding area, it is determined that the bolded character is located in text, and the color conversion is performed (319). If there is blank in the surrounding area, it is determined that the bolded character is in the header or footer, and the color conversion is not performed (323). If there is a photo in the surrounding area, it is determined whether or not there is a character in the further surrounding area (320). If there is a character in the surrounding area, the color conversion for the bolded character is performed since it is probable the bolded character exists in text (322). If there is no character in the surrounding area of the bolded character, the color conversion for the bolded character is not performed since it is probable that the bolded character is in text that explains the photo or name of the photo (321).

If the bolded character is also located on the second page or later (315), the location of the bolded character on the first page is compared with the location of the bolded character on the second page or later. After the comparison, if the location of the bolded character on the first page corresponds with the location of the bolded character on the second page or later (YES in 316), it is determined that the bolded character is in the header or footer, and the color conversion is not performed (317) If the location of the bolded character on the first page does not correspond with the location of the bolded character on the second page or later (NO in 316), the same process as the bolded character exists on the first page is performed.

(3) Other Cases

The surrounding information is identified since there is no need to check the page number (324). If there is a character or blank in the surrounding area, the color conversion of the bolded character is performed (325 and 329). If there is a photo in the surrounding area, it is determined whether or not there is a character in the further surrounding area (e.g., in any direction on the left, right, top, and bottom) (326). If there is a character in the surrounding area, the color conversion for the bolded character is performed since it is probable that the bolded character exists in text (328). If there is no character in the surrounding area of the bolded character, the color conversion for the bolded character is not performed since it is probable that the bolded character is in text that explains the photo or name of the photo (327).

As described above, it is determined whether or not the color of the bolded character is changed. It is no problem to change the above identification (whether or not the color conversion is performed) appropriately in accordance with the situation.

Figure 6:
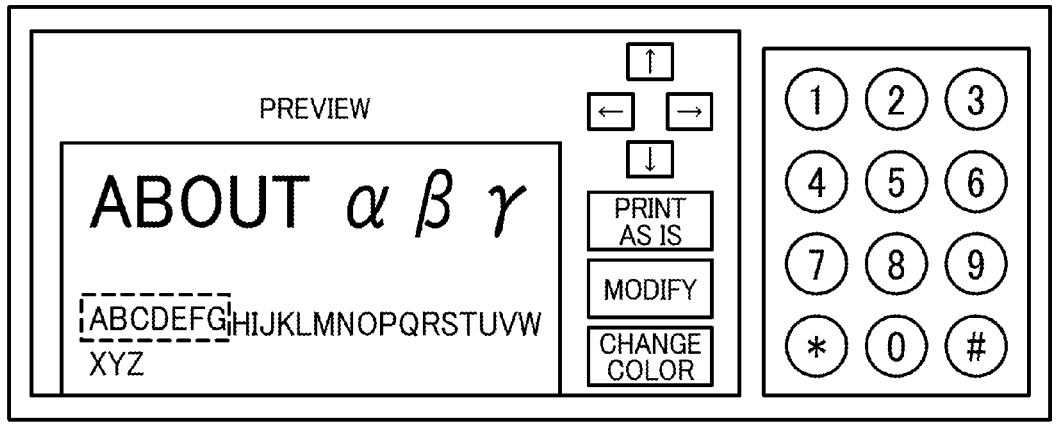
FIG. 6 is a diagram illustrating a preview display as an embodiment of the present invention.

FIG. 6 is a diagram illustrating a preview display. As shown in FIG. 6, it is possible to check whether or not the color conversion has been performed as intended before printing by displaying a preview of the converted part on the display of the image processing apparatus. In FIG. 6, the color conversion is performed on the area surrounded by the broken line, and it is easy to recognize the color-converted part visually by changing the color on the preview actually or by flashing, etc. Consequently, if an area is color-converted unintentionally, it is possible to modify that. Also, by pressing a change color button, it is possible to change the color to be replaced. Furthermore, it is possible to change the color further in a specific area.

Figure 7:
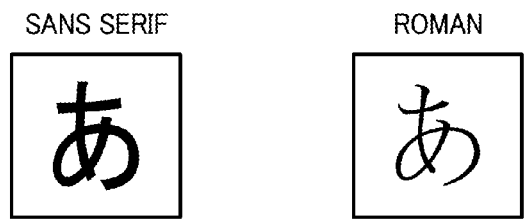
FIG. 7 is a diagram illustrating an example of changing a threshold value for identifying a bolded character in accordance with font information and font size as an embodiment of the present invention.

FIG. 7 is a diagram illustrating an example of changing a threshold value for identifying a bolded character in accordance with font information and font size.

If it is possible to acquire font information, font weight differs depending on a font typeface (sans serif or roman) as shown in FIG. 7. Therefore, if it is possible to acquire font information, the font type identifying unit 115 changes a threshold value in counting pixels for identifying a bolded character in accordance with the font typeface. It should be noted that the character size identifying unit 116 changes a threshold value in counting pixels for identifying a bolded character in accordance with font size, since font weight differs depending on font size, thereby improving detection accuracy of bolded characters.

Figure 8A:
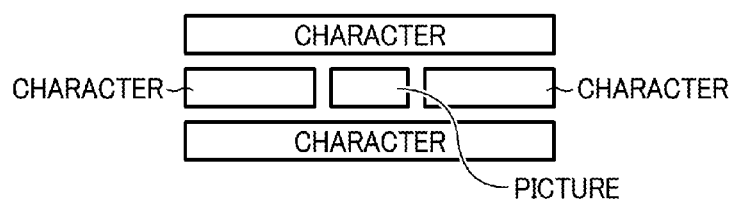
FIGS. 8A and 8B are diagrams illustrating an example of a character identifying method as an embodiment of the present invention.
Figure 8B:
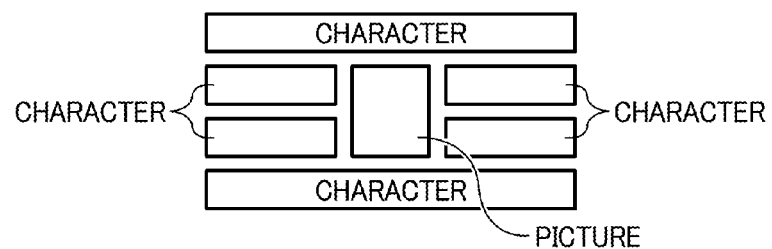

FIGS. 8A and 8B are diagrams illustrating an example of a character identifying method. If font weight is too fat, it is determined that the area is a photo area in processing an image in some cases. To avoid that problem, it is determined that the area is a character area depending on surrounding information even if the target area is a photo area, and color conversion is performed.

As shown in FIG. 8A, if an area surrounded by character information is identified as a photo area, the area is identified as a character area since it is considered very rare that a photo area is located at such position, and color conversion is performed if needed. Similarly, as shown in FIG. 8B, while the area identified as a photo area is surrounded by character information, there are two rows of character areas on the left and right of the photo area. In this case, the photo area is treated as a photo area, and color conversion is not performed.

The present invention can also be implemented by providing a storage medium storing software program code that implements functions of the embodiment described above to a system or an apparatus and reading and executing the program code stored in the storage medium by a computer (a CPU or MPU) in the system or apparatus. In this case, the program code read from the storage medium itself implements functions in the embodiment described above. A hard disk, an optical disk, a magneto-optical disk, a nonvolatile memory card, and a ROM can be used as the storage medium to provide the program code. The present invention includes not only implementing functions in the embodiment described above by executing the read program code by the computer but also implementing functions of the embodiment described above by executing part or all of the above-described processes by an Operating System (OS) run on the computer based on the program code. Furthermore, after the program code read from the storage medium is written in memory included in a function expansion board inserted into the computer or a function expansion unit connected to the computer, the CPU in the function expansion board or the function expansion unit executing a part or all of an actual process based on commands of the program code and implements functions in the embodiment described above by the process is also included within the present invention. The program that implements functions of the embodiment can be provided from a server via a communication network.

Numerous additional modifications and variations are possible in light of the above teachings. It is therefore to be understood that, within the scope of the appended claims, the disclosure of this patent specification may be practiced otherwise than as specifically described herein.

As can be appreciated by those skilled in the computer arts, this invention may be implemented as convenient using a conventional general-purpose digital computer programmed according to the teachings of the present specification. Appropriate software coding can readily be prepared by skilled programmers based on the teachings of the present disclosure, as will be apparent to those skilled in the software arts. The present invention may also be implemented by the preparation of application-specific integrated circuits or by interconnecting an appropriate network of conventional component circuits, as will be readily apparent to those skilled in the relevant art.

What is claimed is:

1. An image processing apparatus, comprising:
   an image-area separator to separate a character area from a monochrome documents;
   a bolded character identifying unit to identify the character area as a bolded character, if a number of pixels in the separated character area is larger than a threshold value;
   a location information identifying unit to identify location information of an object on the document such that the location information identifying unit identifies a location of the bolded character on the document;

a color converter to convert the bolded character into a color image, if the character area is identified as the bolded character based on identification results from the location information identifying unit; and a page number detecting unit to detect a page number that includes the bolded character, wherein, the color converter converts the bolded character into a color image based on the identification results from the location information identifying unit and detection results from the page number detecting unit.

2. The image processing apparatus according to claim 1, wherein the location information identifying unit further identifies information surrounding the bolded character.

3. The image processing apparatus according to claim 2, wherein the color converter performs color conversion, if the bolded character is at a center of the document, the page number is one, and the information surrounding the bolded character is a character, and the color converter does not perform color conversion, if the information surrounding the bolded character is not a character.

4. The image processing apparatus according to claim 2, wherein the color converter performs color conversion, if the bolded character is at any of the upper right, upper center, upper left, lower right, lower center, or lower left of the document, the page number is one, and the information surrounding the bolded character is a character, and the color converter does not perform color conversion, if the information surrounding the bolded character is blank.

5. The image processing apparatus according to claim 2, wherein the color converter does not perform color conversion, if the bolded character is at any of the upper right, upper center, upper left, lower right, lower center, or lower left of the document, the page number is not one, and the location of a bolded character on page number one matches the location of a bolded character on page number two or a subsequent page number.

6. An image processing apparatus, comprising:

an image-area separator to separate a character area from a monochrome document;

a bolded character identifying unit to identify the character area as a bolded character, if a number of pixels in the separated character area is larger than a threshold value;

a location information identifying unit to identify location information of an object on the document such that the location information identifying unit identifies information surrounding the bolded character;

a color converter to convert the bolded character into a color image, if the character area is identified as the bolded character based on identification results from the location information identifying unit; and a page number detecting unit to detect a page number that includes the bolded character, wherein, the color converter converts the bolded character into a color image based on the identification results from the location information identifying unit and detection results from the page number detecting unit.

7. An image processing apparatus, comprising:

an image-area separator to separate a character area from a monochrome document;

a bolded character identifying unit to identify the character area as a bolded character, if a number of pixels in the separated character area is larger than a threshold value;

a threshold value changing unit to change the threshold value based on font information; and a color converter to convert the bolded character into a color image, if the character area is identified as the bolded character.

8. The image processing apparatus according to claim 7, wherein the threshold value changing unit identifies font type and changes the threshold value based on the identified font type.

9. The image processing apparatus according to claim 7, wherein the threshold value changing unit identifies font size and changes the threshold value based on the identified font size.

* * * * *